United States Patent [19]

Patmont

[11] Patent Number: 4,671,471
[45] Date of Patent: Jun. 9, 1987

[54] FOAM REINFORCED ALUMINUM WING STRUCTURE

[75] Inventor: Steven J. Patmont, Pleasenton, Calif.

[73] Assignee: Mitchell Wing, Inc., Sand Springs, Okla.

[21] Appl. No.: 612,270

[22] Filed: May 21, 1984

[51] Int. Cl.$^4$ ............................................. B64C 3/24
[52] U.S. Cl. ................................ 244/123; 416/226; 416/241 A
[58] Field of Search ................... 244/123, 124, 133; 416/226, 241 A; 428/319.1, 318.4, 319.7, 319.3; 156/78, 79; 264/46.4, 46.5, 46.6, 46.7, 46.8, 46.9

[56] References Cited

U.S. PATENT DOCUMENTS

| | | | |
|---|---|---|---|
| 2,693,922 | 11/1954 | Ellison et al. | 244/123 |
| 3,217,807 | 11/1965 | Underhill, Jr. et al. | 244/123 |
| 3,873,654 | 3/1975 | Smith | 244/123 |
| 3,910,531 | 10/1975 | Leomand | 244/123 |
| 3,962,506 | 6/1976 | Dunahoo | 244/123 |
| 4,316,701 | 2/1982 | Scarpati et al. | 416/226 |

Primary Examiner—Galen L. Barefoot
Attorney, Agent, or Firm—Head, Johnson & Stevenson

[57] ABSTRACT

An aircraft or sailboat structure and the method of manufacturing it in which the wing is formed of an elongated leading edge core of lightweight formable cellular material having an aerodynamically configured semi-circular forward surface and a substantially planar rearward vertical surface. A thin structural impervious skin is bonded to the leading edge core forward surface, an elongated trailing edge core formed of lightweight formable cellular material with a thin structural impervious skin bonded to the trailing edge upper and lower aerodynamic surfaces. The trailing edge portion has a substantially vertical forward surface, the vertical surfaces of the leading edge and trailing edge portions being secured to each other to complete the wing. The structural skins are secured to the core portions employing a bonding material and a molding system in which the skins are held in contact with the cores without sufficient pressure, temperature, and time to secure complete bonding.

4 Claims, 4 Drawing Figures

FOAM REINFORCED ALUMINUM WING STRUCTURE

SUMMARY OF THE INVENTION

In recent time, a renewed interest has been generated in light aircraft, that is, inexpensive aircraft powered by small engines for recreational purposes. The first airplane flown, that is, the Wright Brothers airplane, was, in effect a light aircraft. However, in recent times, due to the availability of newer types of structural materials, aircrafts have been designed and used which are even lighter in weight than the original Wright Brothers airplane and which perform substantially better.

One of the problems in constructing aircraft is that of forming the wing. For efficient lift the wing surfaces must be aerodynamically configured with a degree of exactness far more than is required for most of the other portions of an airplane. The efficient wing cross-sectional configuration needs to include aerodynamic upper and lower surfaces including a rounded somewhat semi-circular leading edge, the wing terminating at the rearward edge where the upper and lower surfaces meet. Providing wing structures having good aerodynamic designs and which at the same time are both very light, sturdy, and econonical has been of the challenging problems in aircraft and sailboats. The present invention is directed toward a wing structure and a method of manufacturing it which solves these problems.

Basically the invention relates to an aircraft or sailboat wing which includes an elongated leading edge, and trailing edge portion, the two portions being joined together to form the complete wing. The first element in formulating the leading edge portion is an elongated core of lightweight formable cellular material. The forward surface of the leading edge core is aerodynamically configured substantially of a rounded, semi-circular or semi-elliptical design. The core has a substantially vertical planar rearward surface.

A thin impervious structural skin is bonded to the leading edge of the core forward surface. The trailing edge of the wing is, in cross-section, formed of a forward substantially vertical surface and an upper and lower aerodynamically configured surfaces which extend rearwardly from the vertical surface, the upper and lower surfaces merging together at the rearward end of the trailing edge core. A thin structural impervious skin is bonded to the trailing edge upper and lower surfaces. The completed forward edge and trailing edge portions are then joined together at their respective vertical surfaces to complete the wing structure.

In forming the leading edge and the trailing edge the cores are first formed such as of plastic foam material. A bonding material is then applied either to the cores aerodynamic surfaces or to the structural skins. The flexible skins are then applied to the aerodynamic surfaces of the cores with the bonding material therebetween.

In order to insure secure permanent bonding of the skins to the cores, structural forming members are used which apply pressure to the skin material forcing it against the core material. Heat can be applied to rapidly cure the bonding material so that the skins are permanently and more effectively secured to the core members. Heat is applied such as in the form of a heating blanket between the structural forming members and the skins.

By the methods and apparatus of this invention a wing structure can be formed which is of substantially lightweight material but which is exceedingly strong and durable. Since a minimal amount of meticulous hand labor is required in constructing the wing according to this invention it can be manufactured at a cost substantially less than the standard method of manufacturing wings utilizing spaced parallel ribs with the covering material rivoted at closely spaced intervals to the ribs.

A more thorough understanding of the invention will be had with reference to the following description and claims taken in conjunction with the attached drawings.

DESCRIPTION OF THE PREFERRED EMBODIMENT

Figure 1:
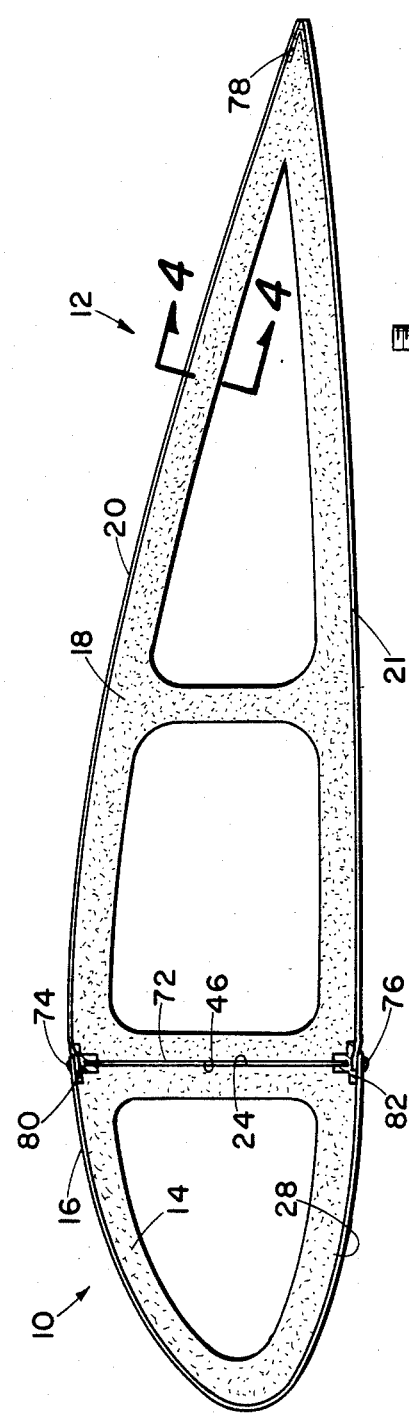
FIG. 1 is an elevational cross-sectional view of an aircraft or sailboat wing employing the methods and systems of this invention.

FIG. 1 shows in cross-section a wing which has been manufactured employing the principles of this invention. The wing includes a leading edge portion 10 and a trailing edge portion 12. These portions are separately constructed and joined together; the method of construction of each will be set forth in detail subsequently. Basically, the leading edge portion includes a core 14 formed of a formable lightweight foam plastic material. While the leading edge core 14 may be solid a preferred arrangement is that it is hollow as shown. Secured to the leading edge core 14 is the leading edge skin 16 which is a material of thin impervious and structural characterics, such as aluminum sheeting. The thickness of the skin material is dependant upon structural requirements.

The trailing edge portion, in like manner, includes a trailing edge core 18 and trailing edge skins 20 and 21. The methods of manufacturing the leading and trailing edge portions 10 and 12 will now be described.

Figure 2:
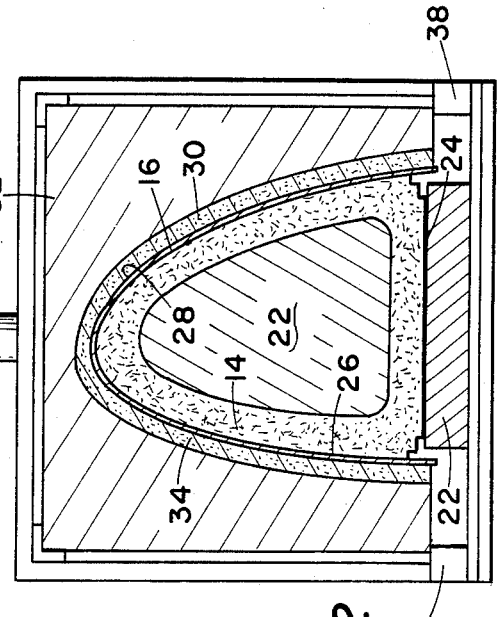
FIG. 2 is an elevational cross-sectional view of the method employed for forming the leading edge portion of the wing of FIG. 1.

Referring to FIG. 2, a cross-sectional view of a press block method of forming a trailing edge is illustrated. The leading edge core 14 is first formed which can be achieved in a mold or cut from bulk stock in the usual manner of forming components of a cellular plastic material, such as plastic foam. A mold, which is not shown, can be formed of wood, fiberglass or the like to provide the external configuration required of the leading edge core material. By insertion of a plug 22 in the mold as core 14 is formed it can be made hollow as illustrated in FIG. 1 to reduce the amount of material required for forming the leading edge, as well as reduce the weight of it.

After core 14 has been formed it is placed on a base 23 with the core flat vertical surface 24 resting on the base.

A bonding material 26 is then applied to the core forward or aerodynamic surface 28. The skin 16 is then placed in contact with the bonding material 26. It can be seen that the bonding material can equally as well be applied to the skin 16 or it may be preferably applied to both surfaces. In any event, the bonding material 26 covers the contact area between the exterior of the core aerodynamic surfaces 28 and the skin 16.

Next, a foam rubber and heating blanket layer 30 is positioned over the outside of the skin 16. Thereafter, a press block 32 which has an interior configured surface 34 conforming to the aerodynamic shape of the wing leading edge is pressed down over the foam rubber and heating blanket 30. A strong compressive force, such as two tons, may be applied by a jack, weight or other suitable device (not shown) to member 36. This forces the core 32 down to firmly engage the foam rubber and heating blanket 30 with skin 16. Stops 38 limit the downward movement of block 32.

With the components in position as shown in FIG. 2 heat can be applied by means of blanket 30 to rapidly cure the bonding agent 26. The time required for the maintenance of the pressure applied by jack member 36 to achieve curing will depend on the characteristics of the particular bonding agent employed and the amount of heat used.

After the bonding agent has cured the force applied by jack member 36 is removed and the block 32 and blanket 30 can be removed leaving the completed wing forward edge 10.

It should be noted that in the illustrated configuration the skin 16 extends somewhat past the base vertical surface 24. These extending portions are utilized in the assembly of the leading and trailing edge of the wing together in a manner to be described subsequently. After the press block 32 is removed, the form block 40 may be extracted leaving the core hollow as in FIG. 1.

Figure 3:
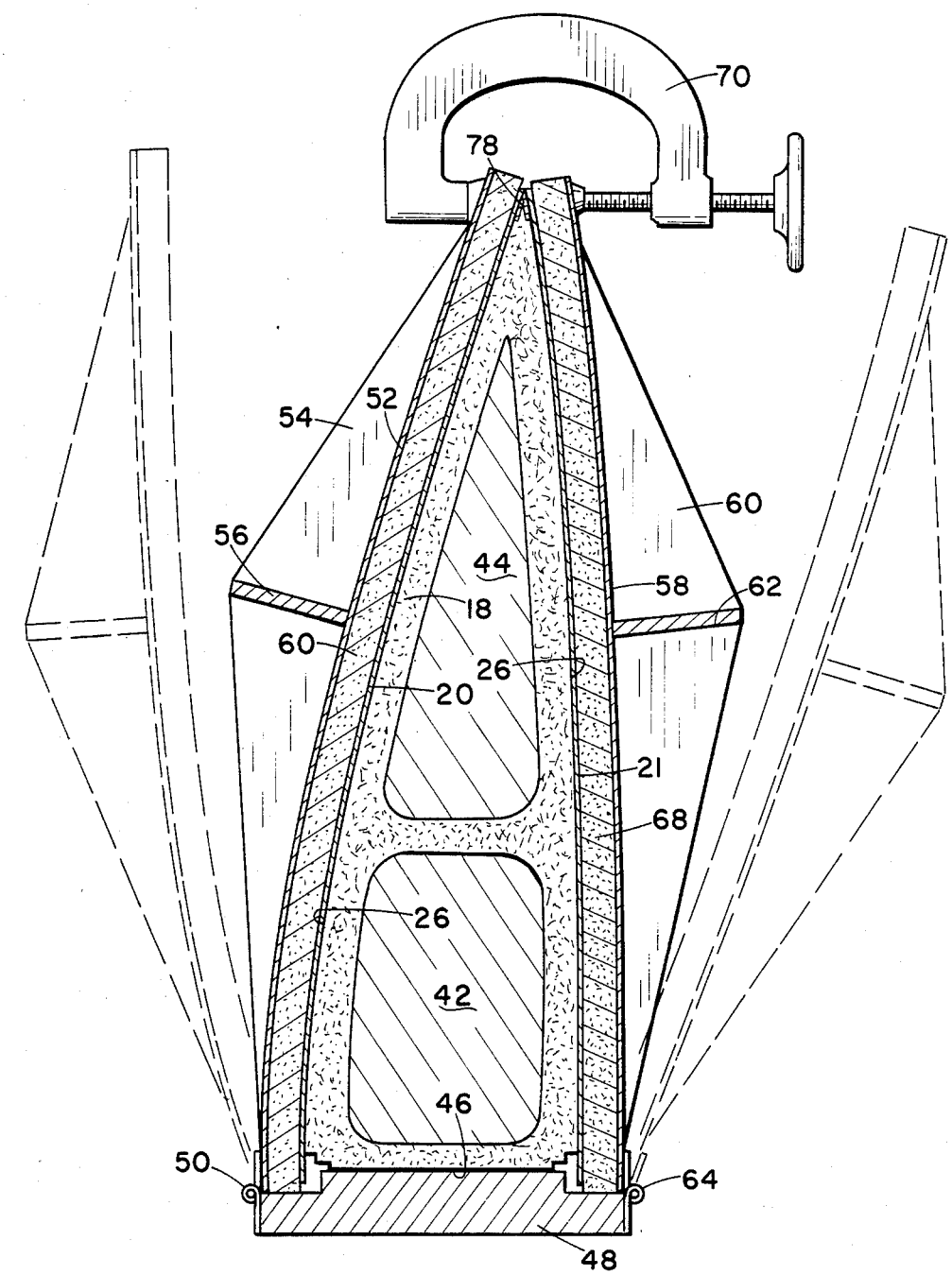
FIG. 3 is an elevational cross-sectional view of the method employed for forming the trailing edge portion of the wing of FIG. 1.

Referring now to FIG. 3 the method of manufacturing the trailing edge portion 12 is illustrated. The trailing edge core 18 is formed as previously described with reference to a leading edge core. Form blocks 42 and 44 are placed in the interior of the core during the attachment of the upper and lower skins 20 and 21. The trailing edge has a vertical forward surface 46 which rests on a base 48. Pivoted to one edge of base 48, by means of a hinge 50, is a first press block 52 which may be formed of metal having reinforced structural members 54 and 56 so as to retain the configuration of the press block to the precisely required aerodynamic configuration required of the finished product. The second press block 58, with its structural members 60 and 62, is pivoted to base 48 by hinge 64 and functions in the same manner as the first press block 52.

With the press blocks swung outwardly away from each other as indicated in dotted outline, the trailing edge core 14 is positioned on block 48. Bonding material is applied to the aerodynamic surfaces of the core or to the surfaces of the trailing edge skins 20 and 21, or to both, and the trailing edge skins positioned in contact with the core. Next, foam rubber and heating blankets 66 and 68 are positioned in contact with the outer surfaces of skins 20 and 21. The press blocks 52 and 58 are swung into position to engage blankets 66 and 68 and the blocks are held in position by a clamp 70. An elongated V-shaped reinforcing strip 78 may be employed to strengthen and reinforce the trailing edge. With heat applied by the blankets the bonding agent will rapidly cure to permanently bond the skins to core 18. After which, pressure in the form of clamp 70 is removed, the first and second press blocks 52 and 58 pivoted away, and the trailing edge wing section removed from the assembly. The form blocks 42 and 44 may then be taken from the interior of the core.

The leading edge 10 and trailing edge 12 are now complete and are ready to be joined together to form a complete wing having the configuration of FIG. 1. The trailing edge vertical surface 46 is bonded to the leading edge vertical surface 24. In order to absorb flight loads, and give additional rigidity to the wings, structural spar caps 80 and 82 are secured to a planar sheet web 72, such as formed of aluminum, or other suitable material. This assembly is inserted between these surfaces with each of the surfaces 24 and 46 being bonded to sheet 72.

To further secure the trailing and leading edge portions of the wing, rivets 74 and 76 are inserted at spaced locations along the length of the wing to secure together the overlapping leading edge skin and the trailing edge skins 20 and 21 top structural members 77 and 78. The wing has then been assembled with a cross-sectional relationship as shown in FIG. 1. The wing when formed in this manner is extremely light and yet strong and durable. In addition, it has complete aerodynamic surfaces. The method of fabrication of the wing according to this invention does not require the designer to compromise in any way in quality of the aerodynamic surfaces of the wing as a highly smooth surface results. At the same time the materials utilized to construct the wing are inexpensive and a minimal amount of meticulous hand work is employed.

Figure 4:
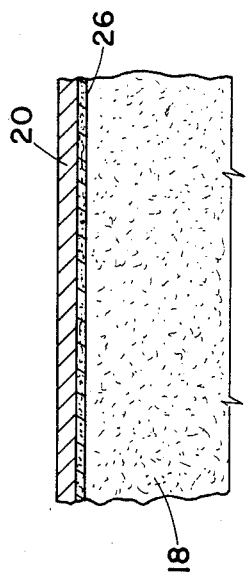
FIG. 4 is a cross-sectional view taken along the line 4—4 of FIG. 1 showing the relationship of the core material, bonding material and skin in forming the wing.

FIG. 4 shows a small enlarged cross-sectional view illustrating the core member 18 and the trailing edge upper skin 20 with the bonding agent 26 between these two components. The same cross-sectional view would be characteristic of other portions of the leading edge and trailing edge of the finished product.

While the invention has been described with a certain degree of particularity it is manifest that many changes may be made in the details of construction and arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A lightweight wing structure for an aircraft or sailboat comprising:
    an elongated leading edge core of lightweight formable cellular material having an aerodynamically configured substantially semi-circular forward surface and a substantially planar rearward vertical surface having an upper and a lower edge;
    a thin, impervious, structural skin bonded to said leading edge core forward surface and extending slightly rearwardly of said vertical surface upper and lower edges;
    an elongated trailing edge core of lightweight formable cellular material having a forward substantially planar vertical edge of height substantially equal said leading edge vertical surface and having an upper and lower edge, having an upper aerodynamic surface extending rearwardly from the upper edge of the vertical surface, and having a lower aerodynamic surface extending rearwardly from the lower edge of said vertical surface, the rearward ends of said upper and lower surfaces merging together;

a thin structural impervious skin bonded to said trailing edge upper and lower surfaces and extending slightly forwardly of said vertical surface upper and lower edges;

means of attaching said forward edge and trailing edge whereby said vertical surfaces are juxtaposed, said skin portions extending beyond said respective vertical surfaces and overlapping each other; and a vertical spar web of thin structural material positioned between said leading and trailing edge vertical structures, the spar web having an upper edge and a lower edge, both of which are riveted to said overlapping skin portions.

2. A lightweight aircraft or sailboat wing structure according to claim 1 wherein said trailing edge and leading edge cores are formed of plastic foam material.

3. A lightweight aircraft or sailboat wing structure according to claim 1 wherein said trailing edge and leading edge cores are, at least in part, hollow.

4. A lightweight aircraft or sailboat wing structure according to claim 1 wherein skin bonded to said aerodynamic surfaces of said cores is sheet aluminum.

* * * * *